United States Patent Office 3,300,999
Patented Jan. 31, 1967

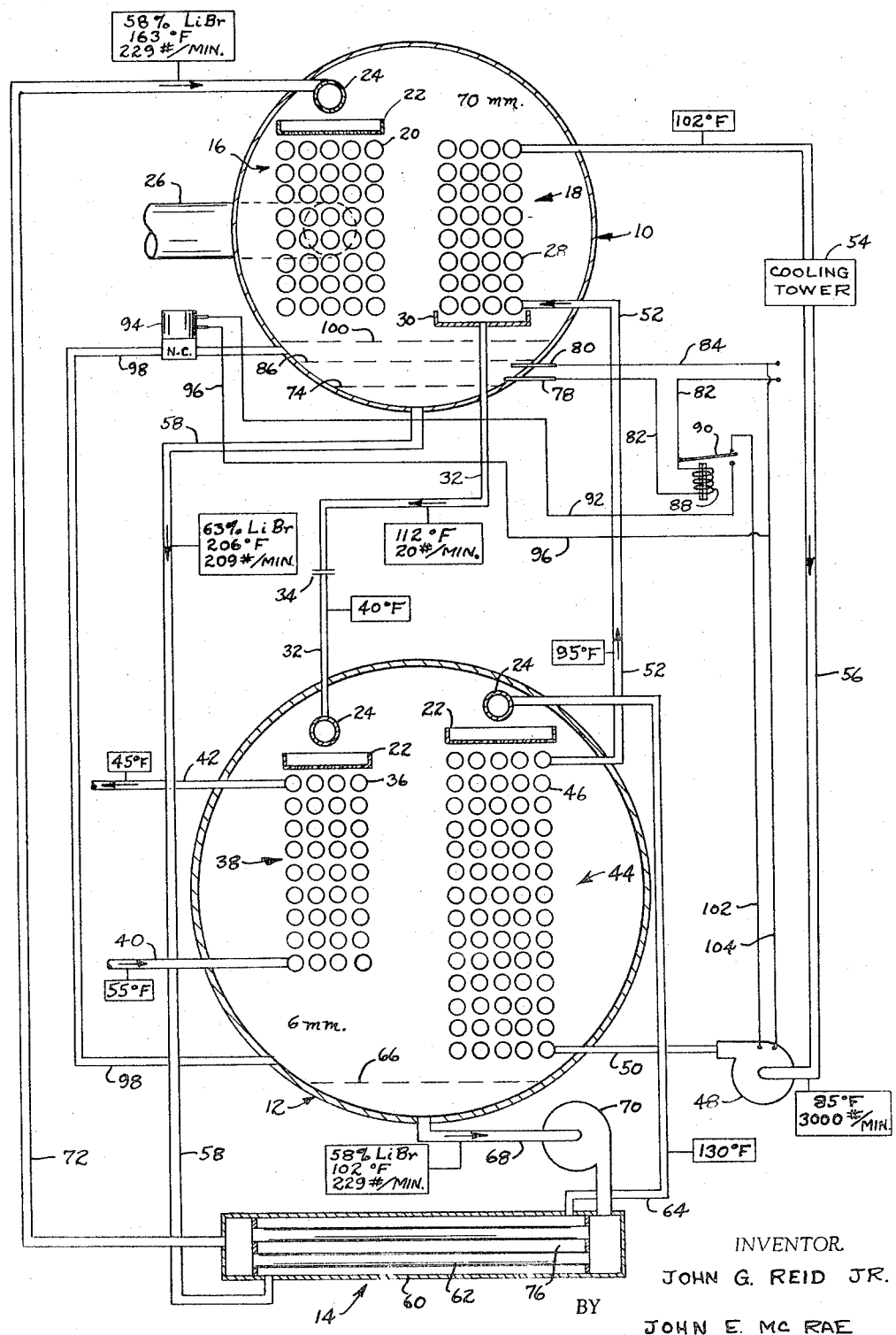

3,300,999
DECRYSTALLIZATING MEANS FOR ABSORPTION REFRIGERATION SYSTEMS
John Graham Reid, Jr., Grosse Pointe, Mich., assignor to American Radiator & Standard Sanitary Corporation, New York, N.Y., a corporation of Delaware
Filed Nov. 18, 1963, Ser. No. 324,377
5 Claims. (Cl. 62—141)

This invention relates to means for decrystallizing solutions in absorption refrigerating systems.

In one commonly used absorption refrigeration system lithium bromide is used as the absorbent and water as the refrigerant. The conventional system comprises a steam-heated refrigerant generator for generating refrigerant vapor from lithium bromide solution, a water-cooled condenser for condensing the refrigerant vapor, a tube-shell refrigerant evaporator for cooling a heat exchange liquid flowing through the evaporator tubes, and a water-cooled absorber for mixing the evaporated refrigerant with strong lithium bromide solution from the generator to absorb refrigerant into solution and return same to the generator.

The efficiency of the system is conventionally improved by causing relatively hot generator solution to exchange heat with relatively cool solution issuing from the absorber. Thus, a heat exchanger is operatively disposed to have the hot generator solution flow through one side and the relatively cool absorber solution flow through the other side. In this manner the temperature of the solution fed to the generator is raised, thereby reducing steam requirements in the generator; the temperature of the solution fed to the absorber is lowered, thereby improving the absorption efficiency.

The spent solution from the generator generally has a relatively high lithium bromide concentration, as for example 63%. As this solution is cooled in the heat exchanger there is a possibility of forming lithium bromide crystals, especially if the concentration should momentarily be too high and/or the cooling action too extreme. Formation of crystals in the heat exchanger is particularly disadvantageous because the crystals can plug up the heat exchanger flow passages and cause shut down of the system. In many cases the formation of such crystals requires dismantling of the heat exchanger and removal of the crystals by blowtorch operations or other decrystallizing procedures.

It is an object of the present invention to provide an absorption refrigeration system with means which automatically removes the absorbent crystals before they can permanently plug up the passages of the system.

A further object is to provide a decrystallizer which functions automatically without human attention.

An additional object of the invention is to provide a decrystallizer which can be incorporated in conventional absorption refrigeration machines.

An additional object is to provide a decrystallizer which can be made available at relatively low cost.

A still further object of the invention is to provide a decrystallizer which operates without permanently disturbing the solution concentration in the system.

Other objects of this invention will appear from the following description, accompanying drawing, and appended claims.

In the drawing:
The single figure is a diagrammatic view of an absorption refrigeration machine having one embodiment of the invention incorporated therein.

Before explaining the present invention in detail, it is to be understood that the invention is not limited in its application to the details of construction and arrangement of parts illustrated in the accompanying drawing, since the invention is capable of other embodiments and of being practiced or carried out in various ways. Also, it is to be understood that the phraseology or terminology employed herein is for the purpose of description and not of limitation.

In the drawings there is shown a refrigeration machine having an upper horizontal cylindrical shell 10, a lower horizontal cylindrical shell 12, and a tube-shell heat exchanger 14 located beneath shell 12.

Shell 10 houses a refrigerant generator designated by numeral 16 and a refrigerant condenser designated by numeral 18. Generator 16 comprises a series of heat exchange tubes 20 arranged in vertical rows beneath a solution distributor 22. Refrigerant-rich solution is supplied to the distributor through a supply pipe 24 having port openings in its lower surface. As diagrammatically shown in the drawings, distributor 22 comprises a horizontal trough having openings in its bottom wall for dripping liquid solution onto the upper surface of each row of tubes 20. In actual practice the distributor is preferably formed as shown in my co-pending patent application, Serial No. 299,274 filed August 1, 1963.

The solution dripping onto the outer surfaces of heat exchange tubes 20 is heated by steam flowing within the tubes. Conventionally the steam is supplied through a steam pipe 26 which connects with a header at one end of shell 10. As the tube 20 surfaces are heated by the steam refrigerant vapor is released from the lithium bromide solution and is automatically drawn over to the heat exchange tubes 28 which form condenser 18. As diagrammatically illustrated in the drawings, tubes 28 are supplied with coolant, for example water at 95° F., whereby refrigerant vapor condenses on the outer surfaces of the tubes, thus raising the temperature of the coolant to a higher value, for example 102° F.

Condensed refrigerant gravitationally flows into a trough 30 which extends the full length of heat exchange tubes 28. Exhaustion of the liquid refrigerant from the condenser is effected through a line 32 which is provided with a restriction 34 for maintaining the pressure in upper shell 10 higher than the pressure in lower shell 12. For example, the upper shell pressure may be in the neighborhood of 70 mm., while the pressure in the lower shell may be about 6 mm. At the lower pressures in shell 12 the refrigerant is vaporized on the outer surfaces of evaporator tubes 36. Liquid refrigerant is preferably distributed onto the surfaces of tubes 36 by the same type distributor that is used for generator 16; accordingly similar numerals are employed.

Tubes 36 are supplied with heat exchange liquid through a diagrammatically illustrated conduit 40 which introduces the liquid, for example water, at a temperature of 55° F. During the passage of liquid through tubes 36 the evaporation of refrigerant on the tube outer surfaces absorbs heat from the flowing heat exchange liquid, and the liquid is thus cooled to a suitable temperature, as for example 45° F., before being exhausted through diagrammatically illustrated conduit 42. As is conventional, the chilled heat exchange liquid is distributed to an external load, which can for example comprise a series of room air conditioner units. The liquid absorbs heat in the conditioner units and is recirculated to evaporator 38 through conduit 40.

As refrigerant is evaporated from the surfaces of tubes 36 it is automatically drawn toward an absorber which is designated generally by numerals 44. As shown in the drawing, the absorber comprises a series of heat exchange tubes 46 which are supplied with coolant, such as water at a temperature of 85° F., from a pump 48. The coolant within tubes 46 accepts heat evolved during the absorption process, and exits through line 52 at a relatively high temperature, as for example 95° F. In the illustrated arrangement this 95° water is supplied to the condenser tubes 28 and thence circulated through a conventional cooling tower 54 before returning to the absorber through line 56, pump 48 and line 50.

The absorption of refrigerant vapor is accomplished with absorbant-rich solution which is initially formed in the upper shell 10 during the vapor-generating operation. This obsorbent-rich solution is withdrawn from shell 10 through a conduit 58. As shown in the drawing, the conduit discharges into shell 60 of heat exchanger 14. The solution passes around the heat exchanger tubes 62 and is thence discharged through a conduit 64, which feeds same to a pipe 24 located within shell 12 above distributor 22. The absorbent-rich solution is thus dripped onto the absorber tubes 46 to absorb the refrigerant vapor within shell 12. Normally a pool of liquid 66 forms in the lower portion of the shell to feed through line 68 to a solution pump 70. As shown, the pump discharges solution into the tubes 62 of the heat exchanger and thence into a passage 72 which supplies the refrigerant-rich solution to the distributor mechanism located in the upper portion of shell 10.

During operation of the system the solution flowing from shell 12 through line 68 is heated from about 102° to about 163° as it passes through heat exchanger 14. The steam requirements for generator 16 are therefore less than they would be otherwise. The spent solution discharged from shell 10 through line 58 is cooled from about 206° to about 130° as it passes through heat exchanger 14. The solution which is dripped onto the outer surfaces of tubes 46 thereby more effectively takes up the heat which is evolved during the absorption process.

During inactive periods a solution of intermediate concentration collects in the lower portion of the machine. During normal operating periods pump 70 is energized to continuously circulate solution through the system, and steam flow through line 26 is modulated to generate refrigerant vapor in accordance with refrigeration demand. Preferably the demand is sensed thermostatically at line 42. Pump 48 is normally operated on a continuous basis so that control of the machine is performed solely by modulating the steam flow in response to the temperature in chilled water line 42. During normal operation the liquid solution in shell 10 may rise to the level designated generally by numeral 74.

During the running periods there is a possibility that lithium bromide crystals will form in certain parts of the system, particularly in the area of heat exchanger 14 designated by numeral 76. In this area the desired concentration of lithium bromide is about sixty-three percent and the temperature is about 130° F. If the system should be unable to maintain the desired concentrations and temperatures crystals may form. For example, if the solution concentration should rise to sixty-six percent and the temperature drop to 120° a slushy mixture of lithium bromide crystals will be formed in the heat exchanger. These crystals will retard the gravity flow of solution through line 58 and will prevent the system from operating.

The present invention is designed to remove crystals from area 76 before they can permanently impede the flow of solution through line 58. In the illustrated refrigeration machine the decrystallizing mechanism comprises two electrical sensing probes 78 and 80 connected with electrical conductors 82 and 84. Probe 80 is located above the normal liquid level 74 in shell 10 so that during normal operation no current flows across the probe elements. However, if crystals should form in area 76 the liquid solution will back up in line 58 to produce a liquid level 86 in shell 10, whereupon a circuit will be established across probes 78 and 80, thus energizing the relay coil 88. Energization of coil 88 causes the relay switch element 90 to be drawn downwardly to complete a circuit from line 82 through 92, the solenoid of a normally closed solenoid valve 94, and a line 96.

Solenoid valve 94 is located in a liquid line 98 which is normally closed by the valve. However when the valve is open and the liquid in shell 10 rises to a level 100 the valve feeds liquid from shell 10 into the lower portion of shell 12. The solution in shell 10 is relatively hot, as for example 206° F. Therefore, as pump 70 continues to operate it delivers hot solution into the tubes 62, thus melting the crystals which are formed in area 76.

The melting action is facilitated by the fact that in the illustrated machine pump 48 has its electric motor supplied with current through two electrical lines 102 and 104 which are associated with switch element 90. During the period when probes 78 and 80 sense the need for decrystallization switch element 90 de-energizes pump 48. The flow of cooling water through the absorber tubes 46 and condenser tubes 28 is thus discontinued.

The condenser tubes 28 are unable to provide a supply of liquid refrigerant for evaporator 38, and no refrigerant is vaporized in shell 12. No coolant is supplied to absorber tubes 46, and due to the blockage at 76 no solution is dripped over the absorber tubes. Therefore the liquid supplied to line 68 is at substantially the temperature of the liquid in shell 10. In effect the condenser, evaporator and absorber are temporarily removed from the system, leaving the generator free to feed hot solution past the crystallized areas.

The crystal melting action is preferably achieved both by the flow of hot solution through line 98 and the temperature rises occasioned by the de-energization of pump 48. During the decrystallizing operation the steam valve for line 26 remains open, but as previously mentioned no refrigerant is generated because condenser tubes 28 are not at this time receiving a supply of cold water. The pressure in shell 10 tends to rise somewhat, and there is a lessened boiling of refrigerant vapor so that the lithium bromide concentration in the lower portion of shell 10 tends to be relatively low. The liquid which is supplied to line 98 is therefore at about the same concentration as the liquid normally in pool 66 so that concentration disturbances are relatively minor. The system can therefore automatically resume full refrigeration production soon after the crystals have been removed from area 76.

When the slushy crystals in area 76 have been removed by the heating operation the restriction to flow of liquid through line 58 is thus removed, and the liquid level in shell 10 automatically drops, thereby exposing the uppermost electrical probe 80 and consequently de-energizing relay 88. The solenoid for valve 94 thereby is automatically de-energized to enable the valve to close line 98. Additionally, pump 48 is automatically re-energized to restart the flow of cooling water through absorber tubes 46 and condenser tubes 28.

It will be understood that the decrystallizing operation is performed automatically and without human attention. In most cases there should be no appreciable disturbance in the chilled water temperature in line 42 or malfunctioning of any of the control components.

The drawing shows an electrical sensing and control mechanism for valve 94 and pump 48. It is contemplated however that the sensing and control mechanisms can be at least partly pneumatic in nature if desired. The drawings show line 98 discharging into shell 12, but this line can of course discharge into line 68. If pump 70 is located downstream from the heat exchange tubes 62 line 98 can discharge directly into the heat exchanger.

What is claimed is:

1. An absorption refrigeration system comprising a generator; condenser; evaporator; absorber; a heat exchanger arranged so that the hot solution flows from the generator through one side of the heat exchanger to the absorber, and cool solution flows from the absorber through the other side of the heat exchanger to the generator; means including a pump for circulating coolant through the absorber and condenser; means responsive to the formation of crystals in said one side of the heat exchanger for directing hot generator solution into the absorber and then through the other side of the heat exchanger to melt the crystals; and means for de-energizing the pump during the melting period; said de-energizing means comprising means for sensing an abnormal rise in generator liquid level due to crystal blockage in the heat exchanger.

2. In an absorption refrigeration system comprising a generator; condenser; evaporator; absorber; and heat exchanger arranged so that hot solution flows from the generator the improvement comprising a normally closed line absorber, and cool solution flows from the absorber through the other side of the heat exchanger to the generator; the improvement comprising a normally closed line from the generator to the other side of the heat exchanger; means responsive to crystallization blockage of said one side of the exchanger for automatically opening said line, whereby to pass hot generator solution through said other side of the exchanger to melt the crystals; and means responsive to removal of the crystallization blockage for automatically closing said line.

3. In an absorption refrigeration system comprising a generator; condenser; evaporator; absorber; means for passing coolant through the absorber; and a heat exchanger arranged so that hot solution flows from the generator through one side of the heat exchanger to the absorber, and cool solution flows from the absorber through the other side of the exchanger to the generator: the improvement comprising a normally closed line from the generator to the other side of the heat exchanger; means sensing an increase in liquid level in the generator due to formation of crystals in said one side of the exchanger; and means controlled by the sensing means for automatically opening said line and halting the flow of coolant through the absorber.

4. In an absorption refrigeration system comprising a first upper shell containing a generator and condenser; a second lower shell containing an evaporator and absorber; a heat exchanger arranged below the lower shell; a first line leading from a lower portion of the upper shell for gravitationally flowing hot solution from the generator through one side of the heat exchanger to the absorber; and means for pumping cool solution from the lower shell through the other side of the exchanger to the generator: the improvement comprising a second normally closed line leading from an intermediate point in the upper shell to the other side of the exchanger; means sensing an abnormally high liquid level in the upper shell due to the formation of crystals in said one side of the exchanger; and means controlled by the sensing means for automatically opening the second line and maintaining same open as long as the sensing means detects an abnormally high liquid level.

5. In an absorpion refrigeration system comprising a first upper shell containing a generator and condenser; a second lower shell containing an evaporator and absorber; means for passing coolant through the absorber and condenser; a heat exchanger arranged below the lower shell; a first line leading from a lower portion of the upper shell for gravitationally flowing hot solution from the generator through one side of the heat exchanger to the absorber; and means for pumping cool solution from the lower shell through the other side of the exchanger to the generator: the improvement comprising a second normally closed line leading from an intermediate point in the upper shell to the other side of the heat exchanger; means sensing an abnormally high liquid level in the upper shell due to the formation of crystals in said one side of the exchanger; and means controlled by the sensing means for automatically discontinuing the flow of coolant through the absorber and condenser, and opening the second line as long as the sensing means detects an abnormally high liquid level.

References Cited by the Examiner

UNITED STATES PATENTS

| 2,430,047 | 11/1947 | Edberg | 62—148 |
| 2,948,124 | 8/1960 | Embury | 62—141 X |
| 2,986,906 | 6/1961 | Stubblefield et al. | 62—487 |
| 3,122,002 | 2/1964 | Miner et al. | 62—476 X |
| 3,154,930 | 11/1964 | Aronson | 62—489 X |
| 3,206,947 | 9/1965 | Bourne et al. | 62—476 X |

LLOYD L. KING, *Primary Examiner.*

MEYER PERLIN, *Examiner.*

N. R. WILSON, *Assistant Examiner.*